(12) United States Patent
Oates

(10) Patent No.: US 7,160,219 B2
(45) Date of Patent: Jan. 9, 2007

(54) METHOD AND APPARATUS FOR LUBRICATING A DIFFERENTIAL GEAR ASSEMBLY

(75) Inventor: Jack Darrin Oates, Fletcher, NC (US)

(73) Assignee: ArvinMeritor Technology LLC., Troy, MI (US)

( * ) Notice: Subject to any disclaimer, the term of this patent is extended or adjusted under 35 U.S.C. 154(b) by 188 days.

(21) Appl. No.: 10/859,831

(22) Filed: Jun. 3, 2004

(65) Prior Publication Data
US 2005/0272551 A1 Dec. 8, 2005

(51) Int. Cl.
*F16H 57/04* (2006.01)
(52) U.S. Cl. ..................................... 475/160
(58) Field of Classification Search ............... 475/159, 475/160, 331; 29/893, 893.3; 74/467, 468
See application file for complete search history.

(56) References Cited

U.S. PATENT DOCUMENTS

| | | | | |
|---|---|---|---|---|
| 1,529,804 A | * | 3/1925 | Nogrady | 475/160 |
| 3,495,298 A | * | 2/1970 | Engle et al. | 184/6.13 |
| 4,031,780 A | * | 6/1977 | Dolan et al. | 475/85 |
| 5,302,158 A | * | 4/1994 | Kwasniewski | 475/160 |
| 6,413,183 B1 | * | 7/2002 | Ishikawa et al. | 475/160 |

* cited by examiner

*Primary Examiner*—Sherry Estremsky
(74) *Attorney, Agent, or Firm*—Carlson Gaskey & Olds

(57) ABSTRACT

An inter-axle differential gear assembly includes a first side gear driven by an input shaft, a plurality of inter-axle differential pinion gears in meshing engagement with the first side gear, and a second side gear in meshing engagement with the inter-axle differential pinion gears. The second side gear includes a gear body having a front face and a rear face positioned opposite of the front face. At least one channel, formed within the gear body, extends between the front and rear faces. Lubricating fluid is pumped through the channel to lubricate the inter-axle differential gear assembly. A tapered roller bearing is positioned adjacent the rear face of the second side gear. A seal, positioned between the tapered roller bearing and the rear face of the second side gear, forms a sealed fluid cavity. Rotation of the tapered roller bearing generates a pumping action that pumps the lubricating fluid through the tapered roller bearing, into the sealed fluid cavity, and into the channel.

19 Claims, 4 Drawing Sheets

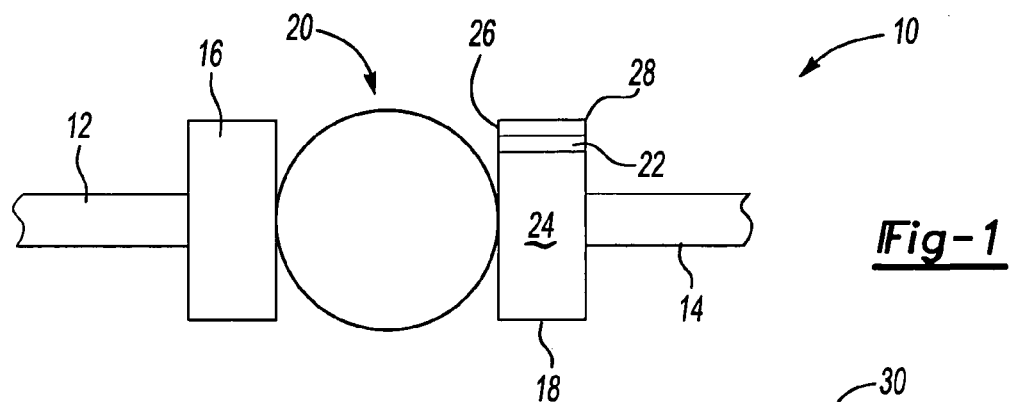
Fig-1
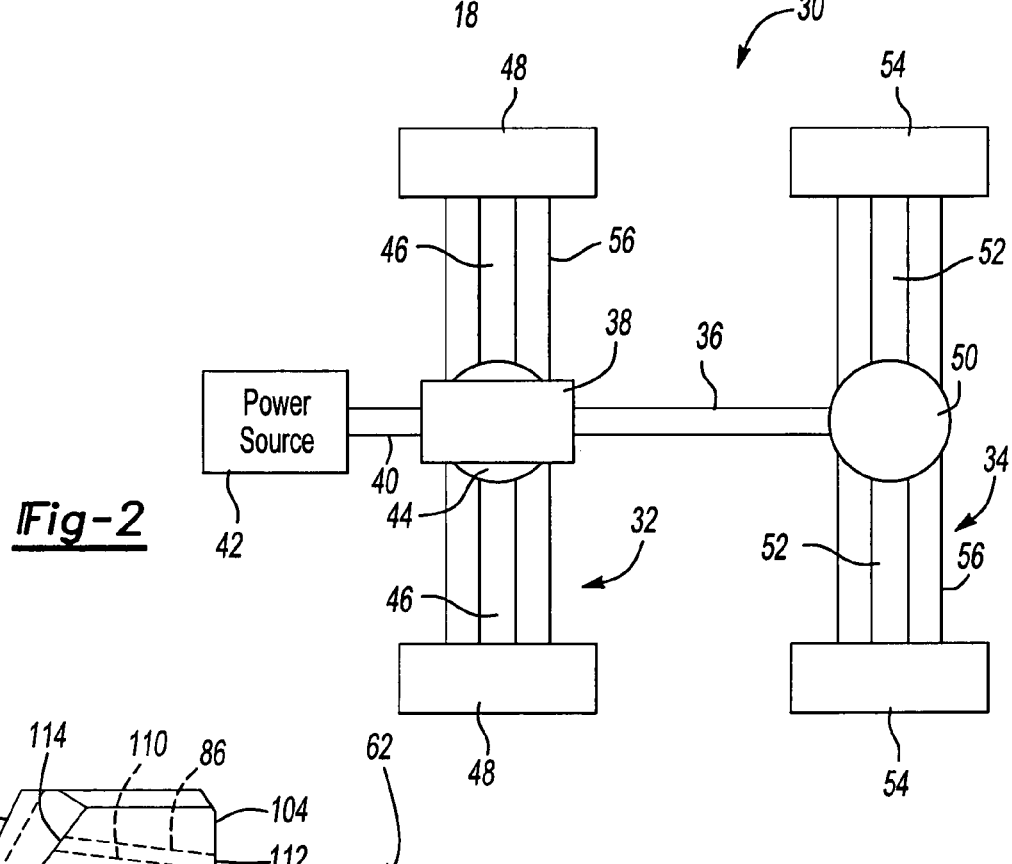
Fig-2
Fig-5

METHOD AND APPARATUS FOR LUBRICATING A DIFFERENTIAL GEAR ASSEMBLY

TECHNICAL FIELD

The subject invention relates to a differential gear assembly with a side gear that includes at least one channel for directing lubricating fluid to the differential gear assembly.

BACKGROUND OF THE INVENTION

Drive axle assemblies traditionally include a differential gear assembly that allows speed differentiation between a pair of shafts. For example, the use of the differential gear assembly in a traditional drive axle configuration allows an outer wheel end to rotate at a faster speed than an inner wheel end as a vehicle negotiates through a turning maneuver. The differential gear assembly includes a first side gear, a second side gear, and a plurality of differential pinion gears that are in meshing engagement with the first and second side gears. The first and second side gears and differential pinion gears interact with each other to provide shaft speed differentiation as needed.

Differential gear assemblies can be used in single drive axles and tandem drive axles. In either type of axle, each of the side gears is coupled to a shaft. In a single drive axle configuration, each side gear is coupled to an axle shaft with each axle shaft driving a wheel end. A tandem drive axle includes a forward-rear axle and a rear-rear axle that is coupled to the forward-rear axle with a connecting driveshaft. In a tandem drive axle configuration, the forward-rear axle and the rear-rear axle each include a differential gear assembly that drives a respective pair of axle shafts.

A tandem drive axle also includes an inter-axle differential gear assembly that allows speed differentiation between the forward-rear and rear-rear axles. The inter-axle differential gear assembly provides speed differentiation between driving input to the differential gear assembly for the forward-rear axle and driving input to the differential gear assembly for the rear-rear axle as needed. The first side gear in an inter-axle differential gear assembly is supported by a driving input shaft and the second side gear is coupled to a thru-shaft. The thru-shaft provides driving output from the forward-rear axle, which drives the connecting driveshaft, which in turn provides driving input to the differential gear assembly of the rear-rear axle.

In either configuration, it is important to properly lubricate gear teeth contact surfaces between the differential pinion gears and the first and second side gears. If an inadequate amount of lubricating fluid is provided, overheating can occur, which can significantly increase gear tooth wear or can lead to premature gear failures.

Proper lubrication takes on even greater importance for an inter-axle differential gear assembly. Due to the unique configuration of the tandem drive axle, inter-axle differential components are susceptible to torsional driveline vibrations. These torsional driveline vibrations can cause gear teeth to flatten at contact lines between mating gear teeth. This flattening problem has an increased occurrence at the second side gear of the inter-axle differential gear assembly.

One solution has been to supply the tandem drive axle with a separate pumping mechanism, such as a gerotor pump lubrication system, for example. This gerotor pump lubrication system is also typically required for inter-axle differential spinout protection. However, the addition of a separate pumping mechanism increases component and assembly costs, and adds complexity to the tandem drive axle.

It would be beneficial to provide a simplified method and apparatus for properly lubricating a differential gear assembly without requiring installation of a separate pumping mechanism. The method and apparatus should be easily incorporated into existing axle designs, as well as overcoming the other above-mentioned deficiencies with existing axle designs.

SUMMARY OF THE INVENTION

A differential gear assembly includes at least one side gear formed from a gear body having a front face and a rear face positioned opposite the front face. At least one channel is formed within the gear body between the front and rear faces. Lubricating fluid is pumped through the channel to lubricate the differential gear assembly.

In one disclosed embodiment, the channel is formed as a thru-hole that extends completely through the gear body from the rear face to the front face. A plurality of side gear teeth is formed about a circumference of the front face of the gear body. These side gear teeth are in meshing engagement with a plurality of differential pinion gear teeth. Gear tooth roots are formed between adjacent side gear teeth. The thru-hole has a first hole end in fluid communication with a fluid cavity at the rear face and a second hole end in fluid communication with a gear tooth root at the front face. The lubricating fluid is pumped from the fluid cavity, through the thru-hole, and to the gear tooth root to lubricate the differential gear assembly.

In one disclosed embodiment, there is a plurality of channels. The channels are radially spaced apart from adjacent channels about a center of the gear body. In one example, four channels are formed within the gear body. Each of these channels is spaced approximately ninety degrees (90°) relative to an adjacent channel about the center of the gear body.

In one disclosed embodiment, the differential gear assembly is an inter-axle differential gear assembly for a tandem drive axle. The tandem drive axle includes a forward-rear axle and a rear-rear axle that is coupled to the forward-rear axle with a connecting driveshaft. An input shaft drives the inter-axle differential gear assembly, which is located in the forward-rear axle, and a thru-shaft comprises a driving output from the forward-rear axle. The thru-shaft drives the connecting driveshaft, which in turn provides driving input to the rear-rear axle. The inter-axle differential gear assembly includes a first side gear, a plurality of inter-axle differential pinion gears, and a second side gear. The first side gear is supported by the input shaft and driven by the inter-axle differential pinion gears. The inter-axle differential pinion gears are in meshing engagement with the first and second side gears. The second side gear is operably coupled to and drives the thru-shaft.

In a tandem drive axle configuration, at least one channel is formed within a gear body of the second side gear. A bearing assembly is positioned near a rear face of the gear body and supports the second side gear for rotation relative to a non-rotating axle member. A seal assembly is positioned between the rear face and the bearing assembly to form a sealed fluid cavity. Rotation of the bearing assembly generates a pumping action that pumps lubricating fluid through the bearing assembly, into the sealed fluid cavity, and into the channel. The lubricating fluid exits from a front face of the second side gear to lubricate the inter-axle differential gear assembly.

The formation of a channel in a gear body for a side gear provides a simple method and apparatus for providing lubricating fluid to a differential gear assembly. These and other features of the present invention can be best understood from the following specification and drawings, the following of which is a brief description.

BRIEF DESCRIPTION OF THE DRAWINGS

FIG. 1 is a schematic view of a differential gear assembly incorporating the subject invention.

FIG. 2 is a schematic view of a tandem drive axle incorporating the subject invention.

FIG. 5 is a side view of a side gear of an inter-axle differential gear assembly incorporating the subject invention.

DETAILED DESCRIPTION OF THE PREFERRED EMBODIMENT

Figure 3:
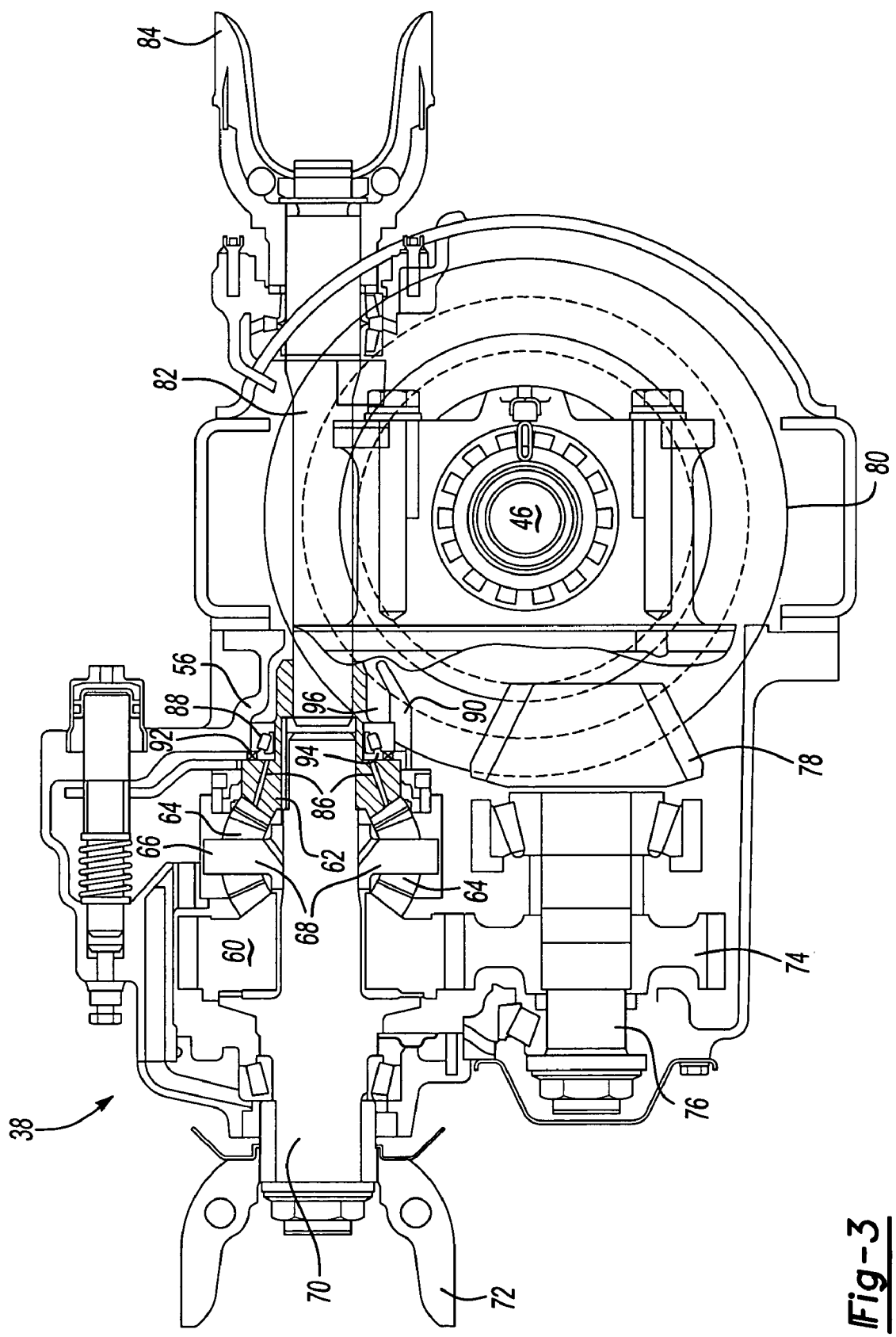
FIG. 3 is a side cross-sectional view of a forward-rear axle of a tandem drive axle incorporating the subject invention.

A differential gear assembly 10, shown in FIG. 1, is used to provide speed differentiation between a first shaft 12 and a second shaft 14. The differential gear assembly 10 includes a first side gear 16, a second side gear 18, and a plurality of differential pinion gears, shown schematically at 20. The differential pinion gears 20 are in meshing engagement with the first 16 and second 18 side gears. The first 16 and second 18 side gears and differential pinion gears 20 interact with each other to provide shaft speed differentiation as needed. The interaction between the first 16 and second 18 side gears and the differential pinion gears 20 to achieve speed differentiation is well known and will not be described in further detail.

In order to provide proper lubrication to mating gear teeth contact surfaces between the differential pinion gears 20 and the first 16 and second 18 side gears, at least one channel 22 is formed within the second side gear 18. The second side gear 18 includes a gear body 24 having a front face 26 and a rear face 28 positioned opposite from the front face 26. The channel 22 extends from the rear face 28 to the front face 26. A lubricating fluid is directed through the channel 22 to lubricate the differential gear assembly 10.

Differential gear assemblies 10 can be used in any type of drive axle including a single drive, tandem drive, or any other type of drive axle configuration. An example of a tandem drive axle 30 is shown in FIG. 2. The tandem drive axle 30 includes a forward-rear axle 32 and a rear-rear axle 34 coupled to the forward-rear axle 32 with a connecting driveshaft 36. The forward rear-axle 32 includes an inter-axle differential gear assembly 38 that is coupled to an input shaft 40, which is driven by a power source 42, such as an engine or electric motor, for example. The inter-axle differential gear assembly 38 provides speed differentiation between the forward-rear axle 32 and the rear-rear axle 34 as is known.

The forward-rear axle 32 includes a forward differential gear assembly 44 that is coupled to forward axle shafts 46 that drive forward-rear axle wheel ends 48. The rear-rear axle 34 includes a rear differential gear assembly 50 that is coupled to rear axle shafts 52 that drive rear-rear axle wheel ends 54. The forward-rear axle 32 and the rear-rear axle 34 each include an axle housing 56 that extends between the respective forward-rear 48 and rear-rear 54 axle wheel ends. The inter-axle differential gear assembly 38 is coupled to drive the forward differential gear assembly 44 and the rear differential gear assembly 50 via the connecting driveshaft 36. The inter-axle differential gear assembly 38 includes a side gear channel formation as described above. This side gear channel formation can be used in any type of differential gear assembly; however, the side gear channel formation will be described in detail in reference to the inter-axle differential gear assembly 38.

The inter-axle differential gear assembly 38 is shown in greater detail in FIG. 3. The inter-axle differential gear assembly 38 includes a first side gear 60, a second side gear 62, and a plurality of inter-axle differential pinion gears 64. The inter-axle differential pinion gears 64 are supported on a differential spider 66. The differential spider 66 has four (4) legs 68 extending from a center body, and one inter-axle differential pinion gear 64 is supported on each leg 68. The four (4) legs 68 and the center body are formed in the shape of a cross. The view in FIG. 3 only shows two (2) legs 68 and two (2) inter-axle differential pinion gears 64.

Figure 4:
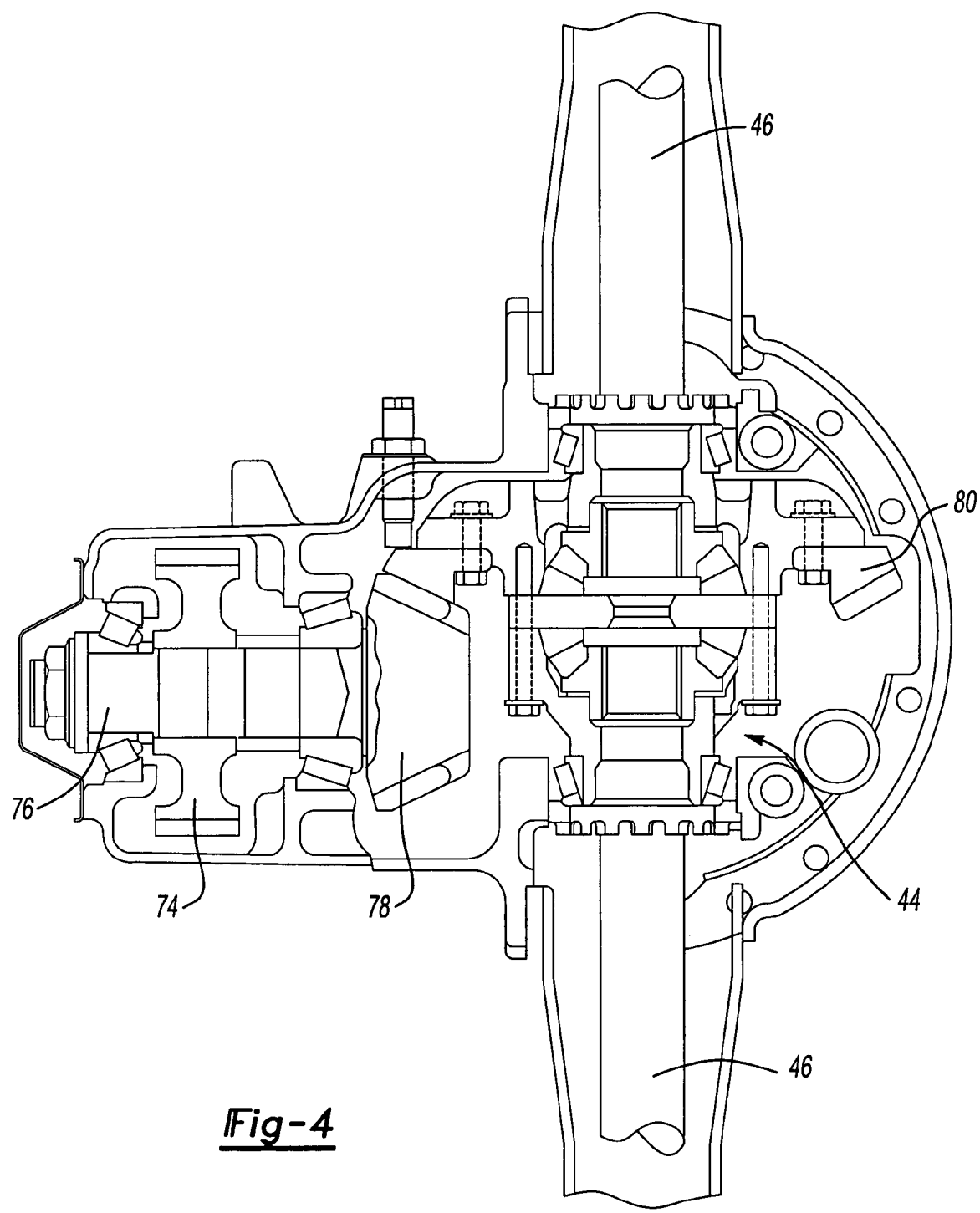
FIG. 4 is a top cross-sectional view of the forward-rear axle of FIG. 3.

The first side gear 60 is a drive gear that is supported on a gear shaft 70, which is coupled to the input shaft 40 with a yoke assembly 72. The first side gear 60 is driven by the inter-axle differential pinion gears 64. The first side gear 60 drives a driven gear 74, which is supported on a pinion gear shaft 76. The pinion gear shaft 76 includes a pinion gear 78 that is in meshing engagement with a ring gear 80. The ring gear 80 is coupled to the forward differential gear assembly 44 to drive the forward axle shafts 46, as shown in FIG. 4.

FIG. 3 shows that the first 60 and second 62 side gears are in meshing engagement with the inter-axle differential pinion gears 64. The second side gear 62 is operably connected to a thru-shaft 82, which is in turn operably connected to the connecting driveshaft 36 with a yoke assembly 84. The thru-shaft 82 provides driving output from the forward-rear axle 32, which provides driving input to the rear-rear axle 34 via the connecting driveshaft 36.

The second side gear 62 includes at least one channel 86 that directs lubricating fluid to the inter-axle differential gear assembly 38. A bearing assembly 88 is positioned on a rear side of the second side gear 62. The bearing assembly 88 supports the second side gear 62 for rotation relative to a non-rotating axle member 90, such as a main carrier casting, for example.

A seal assembly 92 is positioned between the bearing assembly 88 and the second side gear 62. The bearing assembly 88 is preferably a tapered roller bearing, however, any other known bearing assembly could also be used. In one embodiment, the seal assembly 92 engages the rear side of the second side gear 62 and a portion of the axle housing 56. Optionally, the seal assembly 92 could engage the rear side of the second side gear 62 and a bearing cup of the bearing assembly 88. In either configuration, the seal assembly 92 forms a sealed fluid cavity 94 between the bearing assembly 88 and the second side gear 62.

The bearing assembly 88 is supplied with lubricating fluid from the ring gear 80 by way of a fluid catch or trough 96. The fluid catch or trough 96 is flooded with lubricating fluid during normal operation of the forward-rear axle 32. The bearing assembly's 88 natural pumping action forces lubricating fluid from the fluid catch or trough 96 on one side of the bearing assembly 88 to the sealed fluid cavity 94 on an opposite side of the bearing assembly 88. The lubricating fluid then passes through the channel 86 to lubricate the inter-axle differential gear assembly 38.

Figure 6:
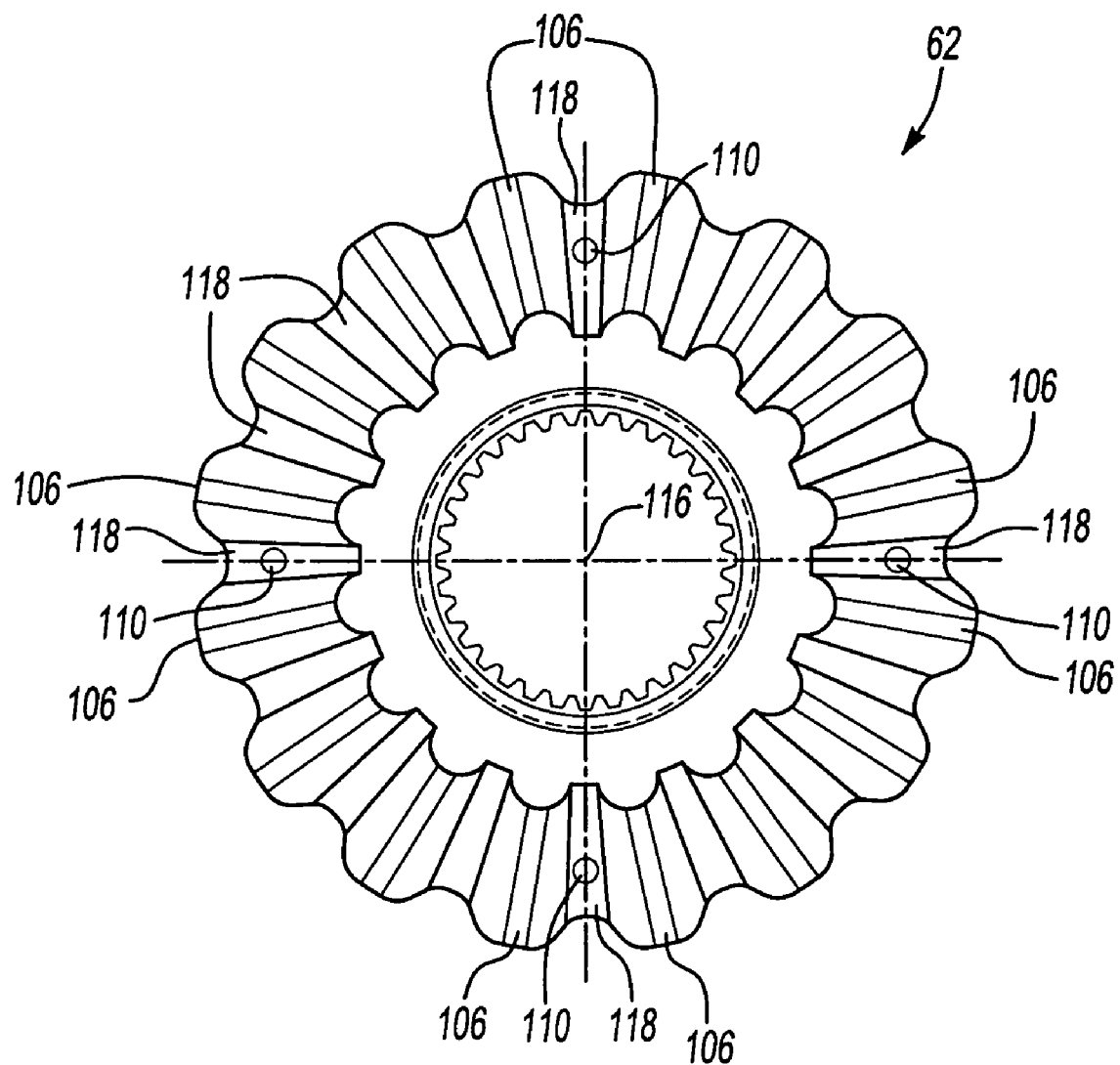
FIG. 6 is a front view of the side gear of FIG. 5.

The second side gear 62 is shown in greater detail in FIGS. 5 and 6. The second side gear 62 includes a gear body 100 with a front face 102 and a rear face 104 positioned opposite of the front face 102. A plurality of side gear teeth 106 is formed about a circumference of the gear body 100 at the front face 102. These side gear teeth 106 are in meshing engagement with the inter-axle differential pinion gears 64. The gear body 100 includes a splined bore 108 that receives the thru-shaft 82. The channel 86 extends through the gear body 100 between the front 102 and rear 104 faces. The channel 86 is preferably a thru-hole 110 that has a first hole end 112 in fluid communication with the sealed fluid cavity 94 and a second hole end 114 that is in fluid communication with the front face 102 of the second side gear 62. Lubricating fluid is pumped into the gear body 100 via the first hole end 112 and out of the gear body 100 via the second hole end 114.

As shown in FIG. 6, a plurality of channels 86 can be formed within the second side gear 62. Each channel 86 is circumferentially spaced apart from an adjacent channel 86 about a gear center 116 defined by the second side gear 62. The channels 86 are spaced apart from each other by a predetermined angular relationship. In one disclosed embodiment, four (4) channels 86 are formed within the second side gear 62, with each channel 86 being positioned approximately ninety degrees (90°) apart relative to an adjacent channel 86. While four (4) channels 86 are shown, it should be understood that a single channel 86, or two or more channels 86, could be formed within the second side gear 62 depending upon lubrication requirements.

A plurality of gear teeth roots 118 is formed between the side gear teeth 106. One gear tooth root 118 is positioned between each pair of adjacent side gear teeth 106. The second hole end 114 is preferably formed at the gear tooth root 118. Thus, the channels 86 extend from the sealed fluid cavity 94 at the rear face 104 to the gear teeth roots 118 on the front face 102. The lubricating fluid passes from the sealed fluid cavity 94 into the channels 86 to the gear teeth roots 118, thus supplying lubricating fluid to a gear mesh, i.e. the inter-axle differential gear assembly 38, which is subjected to torsional vibrations. This unique side gear body formation thus provides a simple and efficient method and apparatus for lubricating the inter-axle differential gear assembly 38.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A differential assembly comprising:
 a differential gear including a gear body having a first side and a second side positioned opposite from said first side wherein said first side comprises a bearing side and said second side comprises a mating gear engagement side;
 at least one channel extending through said gear body between said first and second sides for guiding a lubricating fluid from said first side to said second side;
 a bearing rotatably supporting said differential gear for rotation relative to a non-rotating component; and
 a seal positioned between said gear body and said bearing to form a sealed fluid cavity between said bearing side and said bearing wherein lubricating fluid is pumped from said sealed fluid cavity into said at least one channel.

2. The differential assembly according to claim 1 wherein said differential gear comprises a side gear in meshing engagement with a plurality of differential pinion gears, said side gear being operably coupled to drive a shaft rotatably supported within an axle housing.

3. The differential assembly according to claim 1 wherein said gear body includes a plurality of gear teeth formed about a circumference of said gear body with a gear tooth root being formed between each pair of adjacent gear teeth and wherein said at least one channel comprises a thru-hole having a first hole end in fluid communication with one of said gear tooth roots and a second hole end in fluid communication with said bearing side.

4. The differential assembly according to claim 1 wherein said differential gear comprises a first inter-axle side gear in meshing engagement with a plurality of inter-axle differential pinion gears, said first inter-axle side gear being coupled to a thru-shaft for driving a rear-rear axle, and including a second inter-axle side gear in meshing engagement with said plurality of inter-axle differential pinion gears, said second inter-axle side gear being coupled to a driving input member for driving a forward-rear axle.

5. The differential assembly according to claim 1 wherein said at least one channel comprises a plurality of channels with each of said channels being positioned at a predetermined angle relative to an adjacent one of said channels about a circumference of said gear body.

6. An inter-axle differential gear assembly comprising:
 a first side gear adapted to be driven by an input shaft;
 a plurality of inter-axle differential pinion gears in meshing engagement with said first side gear;
 a second side gear coupled to a thru-shaft and including a gear body having a front face with a plurality of side gear teeth formed about a circumference of said gear body for meshing engagement with said plurality of inter-axle differential pinion gears, and said gear body having a rear face positioned opposite from said front face;
 a seal engaging said rear face of said gear body to form a sealed fluid cavity between said second side gear and a bearing; and
 at least one channel formed within said gear body and extending between said front and rear faces wherein said at least one channel directs a lubricating fluid from said rear face to said front face.

7. The inter-axle differential gear assembly according to claim 6 wherein said bearing supports said second side gear adjacent said rear face for rotation relative to a non-rotating axle member.

8. The inter-axle differential gear assembly according to claim 6 wherein the input shaft drives a tandem axle assembly comprising a forward-rear axle and a rear-rear axle operably connected to said forward-rear axle with a connecting driveshaft wherein said forward-rear axle includes said first and second side gears and said plurality of inter-axle differential pinion gears and wherein said thru-shaft comprises an output from said forward-rear axle that drives said rear-rear axle via said connecting driveshaft.

9. The inter-axle differential gear assembly according to claim 6 wherein said at least one channel comprises a plurality of channels circumferentially spaced apart from one another about a center of said gear body.

10. The inter-axle differential gear assembly according to claim 9 wherein each channel of said plurality of channels extends from a gear tooth root at said front face to said rear face.

11. The inter-axle differential gear assembly according to claim 6 wherein said first side gear comprises a solid gear body without lubrication channels.

12. An inter-axle differential gear assembly comprising:
   a first side gear adapted to be driven by an input shaft;
   a plurality of inter-axle differential pinion gears in meshing engagement with said first side gear;
   a second side gear coupled to a thru-shaft and including a gear body having a front face with a plurality of side gear teeth formed about a circumference of said gear body for meshing engagement with said plurality of inter-axle differential pinion gears, and said gear body having a rear face positioned opposite from said front face;
   a bearing assembly supporting said second side gear adjacent said rear face for rotation relative to a non-rotating axle member;
   at least one channel formed within said gear body and extending between said front and rear faces wherein said at least one channel directs a lubricating fluid from said rear face to said front face; and
   at least one seal assembly positioned between said rear face and said bearing assembly to form a sealed fluid cavity between said second side gear and said bearing assembly.

13. The inter-axle differential gear assembly according to claim 12 wherein said at least one channel comprises a thru-hole extending through said gear body, said thru-hole having a first hole end in fluid communication with said sealed fluid cavity and a second hole end in fluid communication with said front face to lubricate said plurality of side gear teeth.

14. The inter-axle differential gear assembly according to claim 13 including a forward axle pinion gear in meshing engagement with a forward axle ring gear and a forward axle differential gear assembly operably coupled to said forward axle ring gear to drive a pair of axle shafts wherein said first side gear comprises a drive gear for driving said forward axle pinion gear.

15. The inter-axle differential gear assembly according to claim 14 including a fluid trough formed between an axle housing portion and said forward axle ring gear adjacent a rear side of said bearing assembly wherein said bearing assembly pumps lubricating fluid supplied by said forward axle ring gear from said fluid trough into said sealed fluid cavity and through said thru-hole.

16. A method for lubricating an inter-axle differential gear assembly comprising the steps of:
   (a) providing first and second side gears in meshing engagement with a plurality of inter-axle differential pinion gears wherein each of the first and second side gears includes a side gear body with a front face and a rear face;
   (b) forming at least one channel in the side gear body of at least one of the first and second side gears;
   (c) engaging the rear face of the side gear body of the at least one of the first and second side gears with a seal to define a sealed fluid cavity between a bearing and the at least one of the first and second side gears; and
   (d) pumping lubricating fluid through the at least one channel from the rear face to the front face.

17. The method according to claim 16 including the step of forming the at least one channel as a thru-hole having a first hole end in fluid communication with the rear face and a second hole end in fluid communication with the front face.

18. The method according to claim 17 including the steps of forming a plurality of side gear teeth about a circumference of the side gear body on the front face; intermeshing the plurality of side gear teeth with the inter-axle differential pinion gears; and forming the second hole end at a gear tooth root of one of the plurality of side gear teeth.

19. A method for lubricating an inter-axle differential gear assembly comprising the steps of:
   (a) providing a forward axle pinion gear in meshing engagement with a forward axle ring gear wherein the forward axle ring gear is operably coupled to drive a pair of axle shafts extending to opposing vehicle wheels, and providing first and second side gears in meshing engagement with a plurality of inter-axle differential pinion gears wherein each of the first and second side gears includes a side gear body with a front face and a rear face with the first side gear being operably coupled to drive the forward axle pinion gear, and the second side gear being operably coupled to drive a thru-shaft connected to a rear axle;
   (b) forming at least one channel in the side gear body of the second side gear; and
   (c) supporting the second side gear on a bearing assembly positioned adjacent to the forward axle ring gear and pumping lubricating fluid through the at least one channel from the rear face to the front face by generating a pumping action during bearing rotation to direct lubricating fluid supplied by the forward axle ring gear from a fluid trough formed on a rear side of the bearing assembly to a sealed fluid cavity formed on a front side of the bearing assembly.

* * * * *